US 7,675,963 B2

(12) United States Patent
Drewes et al.

(10) Patent No.: US 7,675,963 B2
(45) Date of Patent: Mar. 9, 2010

(54) METHOD AND DEVICE FOR PASSING PARAMETERS TO RAKE RECEIVER

(75) Inventors: Christian Drewes, Germering (DE); Manfred Zimmermann, München (DE); Burkhard Becker, Ismaning (DE); Michael Holstätter, Perchtoldsdorf (AT); Wolfgang Haas, Perchtoldsdorf (AT); Thomas Herndl, Biedermannsdorf (AT)

(73) Assignee: Infineon Technologies AG, Munich (DE)

( * ) Notice: Subject to any disclaimer, the term of this patent is extended or adjusted under 35 U.S.C. 154(b) by 1089 days.

(21) Appl. No.: 11/045,651

(22) Filed: Jan. 28, 2005

(65) Prior Publication Data
US 2005/0207478 A1 Sep. 22, 2005

Related U.S. Application Data

(63) Continuation of application No. PCT/DE03/01169, filed on Apr. 9, 2003.

(30) Foreign Application Priority Data
Jul. 29, 2002 (DE) .................................. 102 34 433

(51) Int. Cl.
*H04B 1/00* (2006.01)
(52) U.S. Cl. ...................... 375/148; 375/144; 375/145
(58) Field of Classification Search ................ 375/148, 375/136, 219, 137, 134, 142, 149, 145, 285, 375/340, 324; 711/1, 102–104, 148, 153, 711/170, 173
See application file for complete search history.

(56) References Cited

U.S. PATENT DOCUMENTS

| 6,324,210 | B1 * | 11/2001 | Yang et al. .................. 375/152 |
| 6,724,810 | B1 * | 4/2004 | Chapman .................... 375/150 |
| 2001/0028677 | A1 * | 10/2001 | Wang et al. ................ 375/148 |
| 2001/0036195 | A1 * | 11/2001 | Garyantes et al. ........... 370/441 |
| 2002/0176482 | A1 * | 11/2002 | Chien ......................... 375/132 |
| 2003/0031236 | A1 * | 2/2003 | Dahlman et al. ............ 375/147 |

(Continued)

FOREIGN PATENT DOCUMENTS

WO    WO 00/69086 A1    11/2000

(Continued)

OTHER PUBLICATIONS

"3$^{rd}$ Generation Partnership Project; Technical Specification Group Radio Access Network; Spreading and Modulation (FDD)", Release 4. 3G TS 25.213 V4.2.0. Dec. 2001, 7 pgs.

(Continued)

*Primary Examiner*—David C Payne
*Assistant Examiner*—Rahel Guarino
(74) *Attorney, Agent, or Firm*—Eschweiler & Associates, LLC (57) ABSTRACT

A device and associated method for passing parameters to a finger in a rake receiver are disclosed. The finger is initially operated with a first parameter set which is held in a first memory area (PAR_RAM). To change the parameter set, a second parameter set is loaded into a second memory area (PAR_CHG_RAM1/2), a check is carried out to determine whether a switching condition (SCHED_RAM) is satisfied, and if it is an access for that finger is switched (MUX) from the first memory area (PAR_RAM) to the second memory area.

25 Claims, 5 Drawing Sheets

U.S. PATENT DOCUMENTS

2003/0053525 A1* 3/2003 Mehrabani et al. .......... 375/148
2004/0121754 A1* 6/2004 Tenda .......................... 455/334

FOREIGN PATENT DOCUMENTS

WO    WO 02/08892 A1    1/2002

OTHER PUBLICATIONS

"3$^{rd}$ Generation Partnership Project; Technical Specification Group Radio Access Network; Physical Channels and Mapping of Transport Channels onto Physical Channels (FDD)", Release 4, 3GPP TS 25.211 V4.1.0.. Jun. 2001, 5 pgs.

* cited by examiner

METHOD AND DEVICE FOR PASSING PARAMETERS TO RAKE RECEIVER

REFERENCE TO RELATED APPLICATIONS

This application is a continuation of PCT/DE03/01169, filed Apr. 9, 2003 which was not published in English, which claims the benefit of the priority date of German Patent Application No. DE 102 34 433.7, filed on Jul. 29, 2002, the contents of which both are herein incorporated by reference in their entireties.

FIELD OF THE INVENTION

The invention relates to a method and a device for passing operating parameters to a rake finger in a rake receiver.

BACKGROUND OF THE INVENTION

Radio signals in mobile radio are subject to multipath propagation, that is to say a number of versions of the received signal appear in the receiver as a result of reflection, scatter and diffraction of the transmitted radio signal on various obstructions in the propagation path, which versions of the received signal are shifted in time with respect to one another and are subject to different attenuations. The principle of operation of a rake receiver is based on separate evaluation of the received signal versions with the highest energy, which are then superimposed with the correct timing. The expression "rake" in this case figuratively describes the structure of a receiver such as this, with the tines of the rake representing the rake fingers, and the handle of the rake representing the superimposed received signal produced on the output side.

Rake receivers are known and are frequently used in mobile radio stations.

Each rake finger operates with the aid of a set of operating parameters, which determine the function of that rake finger. The set of operating parameters includes the delay time which the rake finger "sets" for the desired propagation path, that is to say it selects one of the versions of the received signal. In the case of CDMA (Code Division Multiple Access) systems, further parameters are added in order to despread the received spread-coded received signal versions in each rake finger. Details relating to the scrambling sequence and the spread code to be despread as well as details relating to the spreading factor on which it is based are signaled in parametric form to the rake finger.

The parameter set is normally stored in a parameter memory, which is accessed by the rake finger.

During operation, the rake fingers which are physically present are generally not all allocated. If an active rake finger with a parameter set which is no longer required is intended to be deactivated and a rake finger with a new parameter set is required, one of the free rake fingers with the new parameter set is activated in good time at the time of the start of a time slot or frame, according to the previous procedure. The change from the rake finger with the parameter set which is no longer required to the rake finger with the new parameter set then takes place by switching from the output of the "old" rake finger to the output of the "new" rake finger.

One disadvantage of this procedure is that, at least temporarily, at least two rake fingers must always be set up in order to change the parameter sets. This results in increased power consumption and, furthermore, the necessity to always keep free (unallocated) rake fingers available for a change.

SUMMARY OF THE INVENTION

The following presents a simplified summary in order to provide a basic understanding of one or more aspects of the invention. This summary is not an extensive overview of the invention, and is neither intended to identify key or critical elements of the invention, nor to delineate the scope thereof. Rather, the primary purpose of the summary is to present one or more concepts of the invention in a simplified form as a prelude to the more detailed description that is presented later. The invention is based on providing a method and a device for passing parameters to a rake finger which allow a rake receiver to be reprogrammed flexibly and in a manner which conserves resources According to one or more aspects of the present invention, a rake finger is initially operated with a first parameter set by the rake finger accessing the first parameter set which is held in a first memory area. In the event of a desire to change the parameter set, a second parameter set is loaded in a second memory area. A check is carried out to determine whether a switching condition is satisfied. As soon as this is the case, the access for the rake finger is switched from the first memory area to the second memory area.

One or more aspects of the present invention allow the rake finger to be reallocated without having to activate an additional rake finger for this purpose. Instead of switching the outputs of various rake fingers, the parameter sets for one and the same rake finger are switched during operation. No interruption occurs in the operation of the rake finger since the use of two memory areas means that there is no waiting time for updating the memory content in the first memory area.

The check for the satisfaction of the switching condition is preferably carried out at time intervals in a fixed time frame. The time intervals are preferably each four chip periods and in one example correspond to the processing pattern which is used for the despreading of the data in the rake fingers with a spreading factor of four or an integer multiple of four.

One advantageous method variant is characterized in that the second parameter set is loaded in the first memory area. This results in the first memory area being supplied with the current parameters once again. The access of the rake finger to the second parameter set and the loading of the second parameter set in the first memory area can preferably take place at the same time by means of one and the same read operation being carried out on the second memory area.

In order to prepare for the parameter change, the second parameter set is initially loaded into the second memory area. A change flag is then set in an administration memory, with time information which indicates the time at which the switching of the rake finger should take place. Upon reaching the switching time, the switching between the memory accesses (and thus between the two parameter sets) can take place by evaluation of the time information (provided that the change flag is set).

According to one or more aspects of the present invention, a device for passing parameters to a rake finger in a rake receiver includes a first memory area for a first parameter set of operation parameters for the rake finger, a second memory area for a second parameter set of operating parameters for the rake finger, a control means which checks whether a switching condition is satisfied, and a switching means which switches the access for the rake finger from the first memory area to the second memory area when the control means finds that the switching condition is satisfied. The provision of two memory areas in which the previous (first) and the new (second) parameter sets are kept available for the rake finger at the same time allows switching of the parameter sets without interruption in the demodulation operation of the rake finger under consideration.

In one example, a device for passing parameters preferably has a data link via which both the rake finger and the first memory area can access the data in the second memory area. This makes it possible to update the first memory area with the new parameters immediately after the switching process transpires (that is to say within the first cycle).

By way of further example, the second memory area is advantageously formed by a number of individual RAM memories. The provision of a number of memories makes it possible for the rake finger that is to be reprogrammed to make a read access to the second memory area in each system clock cycle while, furthermore, a DSP (digital signal processor) can additionally write to this second memory area. In this case, the second memory area may be designed with single-port RAMs, for example.

BRIEF DESCRIPTION OF THE DRAWINGS

The invention is explained in more detail below wherein reference is made to the following drawings.

DETAILED DESCRIPTION OF THE INVENTION

One or more aspects of the present invention will now be described with reference to the drawing figures, wherein like reference numerals are used to refer to like elements throughout. It should be understood that the drawing figures and following descriptions are merely illustrative and that they should not be taken in a limiting sense. In the following description, for purposes of explanation, numerous specific details are set forth in order to provide a thorough understanding of the present invention. It will be evident to one skilled in the art, however, that the present invention may be practiced without these specific details. Thus, it will be appreciated that variations of the illustrated systems and methods apart from those illustrated and described herein may exist and that such variations are deemed as falling within the scope of the present invention and the appended claims.

The following text considers a CDMA system as is used, by way of example, in the UMTS (Universal Mobile Telecommunications System) mobile radio standard. When using a band spreading technique, so-called spreading codes are applied to the symbols to be transmitted from the transmitter end that make it possible to distinguish between the individual symbols, in figurative terms, in the form of a fingerprint. A spreading code is a sequence of chips, the number of which is referred to as the spreading factor sf. The chip time period is specified in CDMA systems, and in the case of UMTS is 1/(3.84 MHz).

A total of 2560 chips form one time slot. Fifteen time slots are combined to form a frame. The frame, time slot and chip period are thus specified in a fixed form in the UMTS.

In addition to the spread coding of subscriber-specific data, data which is intended for a number of receivers (for example system-relevant data) is also band-spread in the UMTS standard. In addition, in the case of UMTS systems, the spread data is multiplied by a base-station-specific scrambling sequence.

The signals are transmitted from a base station to a mobile station (downlink) and from a mobile station to a base station (uplink) using so-called physical channels. The physical channels in a mobile radio system are likewise specified by standardization. Each physical channel is identified by rules for the spread coding and by a specific data structure. While some physical channels are provided only for transmission of signals with a fixed spreading factor sf, signals transmitted in other physical channels may have a variable spreading factor.

The signals which are transmitted via the various physical channels are all demodulated by the rake receiver. A number of physical channels (e.g., monitoring channels, subscriber-specific data channels, etc.) normally have to be demodulated at the same time. The following steps have to be carried out for the respective signals to be demodulated (that is to say for the currently used physical channels):

estimation of the time delays $\tau$ for the individual propagation paths;

elimination of the delays $\tau$;

correlation of the path components with the correct timings with chip sequences d* which are complex-conjugate products of the spreading code and scrambling sequence;

estimation of a complex weight c for each propagation path;

multiplication of the respective path component by its complex weight c; and combination of the synchronized, despread path components, multiplied by the respective complex weights, in order to reconstruct the transmitted signal.

Figure 1:
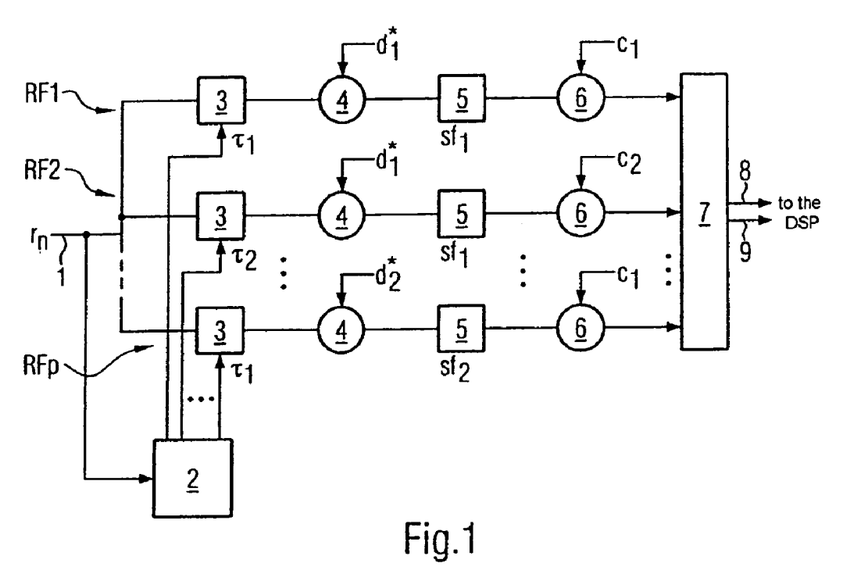
FIG. 1 is a block diagram illustrating a rake receiver.

FIG. 1 illustrates a configuration of a rake receiver.

A received signal $r_n$ in discrete-time form is input at an input 1. The sampling index, that is to say the time in discrete form, is n. The received signal $r_n$ is produced in a normal manner by scanning and digitization of an analog intermediate-frequency or baseband signal produced by means of a radio-frequency stage (e.g., antenna, input filter, mixing stage), which is not illustrated. The sampling frequency; $T_s^{-1}$ must satisfy the Nyquist condition with respect to the chip rate $T_s^{-1}$ (3.84 MHz).

In order to simplify the explanation, the following text is based on the assumption that the rake receiver is receiving (a number of) signals from only one base station. The index j denotes the various signals. The index i denotes the various propagation paths between the base station and the receiving antenna of the rake receiver. The received signal $r_n$ is supplied not only to a total of p rake fingers RF1, RF2, ..., RPp of identical design but also to a unit 2 for estimation of the (multipath) delays $\tau_i$. Each rake finger RF1, RF2, ..., RFp comprises a delay stage 3 arranged on the input side, a correlator 4, an accumulator 5 and a multiplier 6. The outputs of the individual rake fingers RF1, RF2, ..., RFp are supplied to a combiner 7, whose output side is connected to a DSP.

The channel profile is determined in the unit 2 for estimation of the delays $\tau_i$ (that is to say the energy levels of the signal components transmitted via the various propagation paths i are determined). The channel profile is used to determine the delays $\tau_1$ for the propagation paths with the highest energy. For example, the delay $\tau_1$ is determined for a signal component transmitted via the propagation path i=1, and is supplied to the delay stage 3 for the first rake finger RF1, the delay $\tau_2$ is determined for a second propagation path i=2 and is supplied to the delay stage 3 for the second rake finger RF2, . . . , and the delay $\tau_1$ for the propagation path i=1 is supplied to the delay stage 3 for the p-th rake finger RFp.

The first two rake fingers RF1 and RF2 should demodulate the same signal j=1 with the spreading factor $sf_j$, that is to say $sf_1$. One and the same subscriber-specific chip sequence $d_j^*$ (which is a product of the spreading code and the scrambling sequence for the base station), that is to say $d_1^*$ is therefore supplied for despreading purposes to the correlators 4 for the rake fingers RF1 and RF2. The correlator 4 for the rake finger RFp despreads a different signal j=2 with the chip sequence $d_2^*$, whose spreading factor is $sf_2$. The superscript index * represents the complex-conjugate.

The signals which are transmitted via the same path i=1 are separated on a code-specific basis in the fingers RF1 and RFp by using different spreading codes in the rake fingers RF1 and RFp.

The spreading factors $sf_1$ and $sf_2$, which may differ, are signaled to the associated accumulators 5 in the rake fingers RF1, RF2, RFp. The accumulators 5 accumulate the chips over a symbol time period $T_j$ based on the respective spreading factor (that is to say they carry out $sf_j$ accumulation processes, $T_j = sf_j \cdot T_c$). The data downstream from the accumulators 5 at the (respective) symbol clock rate is multiplied in the multipliers 6 by the complex weights $c_i$ determined in a channel estimator (not illustrated). These are identical for the rake fingers RF1 and RFp, since the same propagation path i=1 (starting from the same base station) is considered, and are $c_1$. The rake finger RF2 associated with another propagation path i=2 is supplied with different complex weights $c_2$.

The combiner 7 combines the path components associated with the same signals j. In the example described here, the outputs of the rake fingers RF1 and RF2 associated with the signal j=1 are combined, and are emitted via an output 8, while the output from the rake finger RFp associated with the signal j=2 is produced without being combined at an output 9 of the rake receiver. As can clearly be seen from FIG. 1, each rake finger RF1, RF2, . . . , RFp must be allocated for operation by means of the parameters $\tau_i$, $sf_j$ and characteristic details relating to the chip sequence $d_j^*$, that is to say it is assigned to a specific propagation path i for a specific signal j (the complex weights $c_i$ are redetermined continuously and are not parameters for allocation of the finger).

It should be noted that the delay stage 3 can also be arranged at a different point in the signal path, for example downstream from the multipliers 6.

Figure 2:
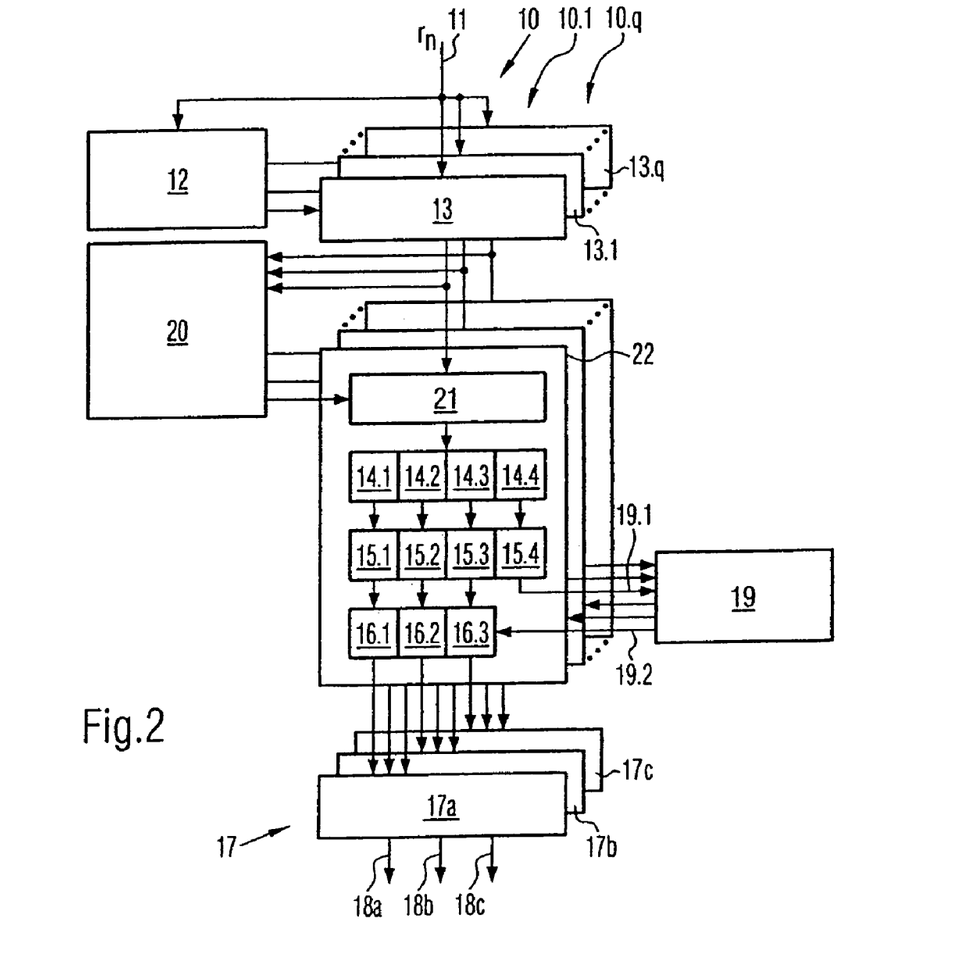
FIG. 2 is a schematic illustration of a number of multicode rake fingers, each comprising four individual demodulators arranged in parallel.

FIG. 2 shows a variant of the rake receiver illustrated in FIG. 1. This shows a 4-channel multicode rake finger 10 as well as 4-channel multicode rake fingers 10.1 and 10.$q$ of identical design, which are illustrated in perspective one behind the other. Overall, the rake receiver illustrated in FIG. 2 thus comprises a total of q+1 4-channel multicode rake fingers 10; 10.1; . . . , 10.$q$, which are referred to in the following text as MC rake fingers 10; 10.1; . . . ; 10.$q$.

On the input side, the MC rake finger 10 has a single, common delay stage 13, which receives the received signal $r_n$ in discrete time form, via the input 11. An interpolator 21 is provided further in the signal path. The output signal from the interpolator 21 is passed to four correlators 14.1, 14.2, 14.3, 14.4, which are arranged in parallel. The correlators 14.1, . . . , 14.4 are followed by four accumulators 15.1, 15.2, 15.3, 15.4, which are connected in parallel, each of which receives an output signal from one of the correlators 14.1, . . . , 14.4. The output signals from the accumulators 15.1, 15.2, 15.3 are passed to three weighting units (multipliers) 16.1, 16.2, 16.3, which are arranged in parallel. The outputs from the three weighting units 16.1, 16.2, 16.3 are supplied to a combiner 17, which has three adders 17$a$, 17$b$ and 17$c$. The output from the adder 17$a$ is annotated with the reference symbol 18$a$, the output from the adder 17$b$ is annotated with the reference symbol 18$b$, and the output from the adder 17$c$ is annotated with the reference symbol 18$c$.

The MC rake finger 10 has an associated unit 19 for estimation of the complex channel weights $c_i$. The unit 19 is connected via a connection 19.1 to the output of the accumulator 15.4, and produces the (identical) complex channel weights $c_i$ for the three weighting units 16.1, 16.2 and 16.3 via a connection 19.2.

The other MC rake fingers 10.1 and 10.$q$ which can be seen in FIG. 2 likewise have a respective delay stage 13.1, 13.$q$ and have an identical design in terms of the assemblies 21, 14.1-4, 15.1-4, 16.1-3 illustrated in the frame 22.

The structuring of the rake receiver in MC rake finger 10, 10.1, . . . , 10.$q$ is based on the following concept:

Respective MC rake fingers 10; 10.1, . . . , 10.$q$ are set to a specific propagation path i, i=0, . . . , q, (that is to say it is operated with a specific delay $\tau_i$) and can simultaneously demodulate three different data signals j=1, 2, 3 and one monitoring signal j=4. The correlators 14.1, 14.2, 14.3, accumulators 15.1, 15.2, 15.3 and weighting units 16.1, 16.2, 16.3 are used for demodulation of the data signals j=1, 2, 3, in which case the spreading factor $sf_j$ for these signals may be variable, and they may differ from one another. In addition to the three demodulator units 14.1, 15.1, 16.1; 14.2, 15.2, 16.2; 14.3, 15.3, 16.3, which are provided for data reception, the further demodulator unit 14.4, 15.4 is designed for demodulation of a pilot signal for channel estimation. This means that each of the three demodulator units 14.1, 15.1, 16.1; 14.2, 15.2, 16.2; 14.3, 15.3, 16.3 for an MC rake finger 10 is a complete rake finger as shown in FIG. 1. Reference is made to the statements there relating to the method of operation of the individual components. The demodulator 14.4, 15.4, whose design is simpler, is provided solely for measurement tasks and is not suitable for data reception, owing to the absence of a weighting unit.

The multipath delay $\tau_i$ for the rake finger 10 is estimated and compensated for in two stages. First, the unit 12 is used to estimate the multipath delay $\tau_i$ in the sampling time frame with an accuracy which is a function of the sampling rate $T_s^{-1}$ or $(T_s/2)^{-1}$. The rough delay setting which is then obtained is implemented by the delay stage 13. More precise resolution of the multipath delay is then achieved by the unit 20 for calculation of an interpolation parameter (e.g., sampling time error). The interpolator 21 is driven by the calculated interpolation parameter and produces interpolated data values at the support point defined by the interpolation parameter. The unit 20 for calculation of an interpolation parameter may, for example, be an early/late correlator.

The two stages 12, 13 and 20, 21 may also be designed as single stages, as is illustrated in FIG. 1. Furthermore, the two units 13, 21 which correspond to the delay stage 3, may also be arranged at a different point in the signal path, as has been described with reference to FIG. 1.

The data for the signal j=1 is emitted at the output 18$a$ from the adder 17$a$, the data for the signal j=2 is emitted at the output 18$b$ from the second adder 17$b$, and the data for the third signal j=3 is produced at the output 18$c$ from the third adder 17$c$. A maximum of q+1 propagation paths may be considered.

Figure 3:
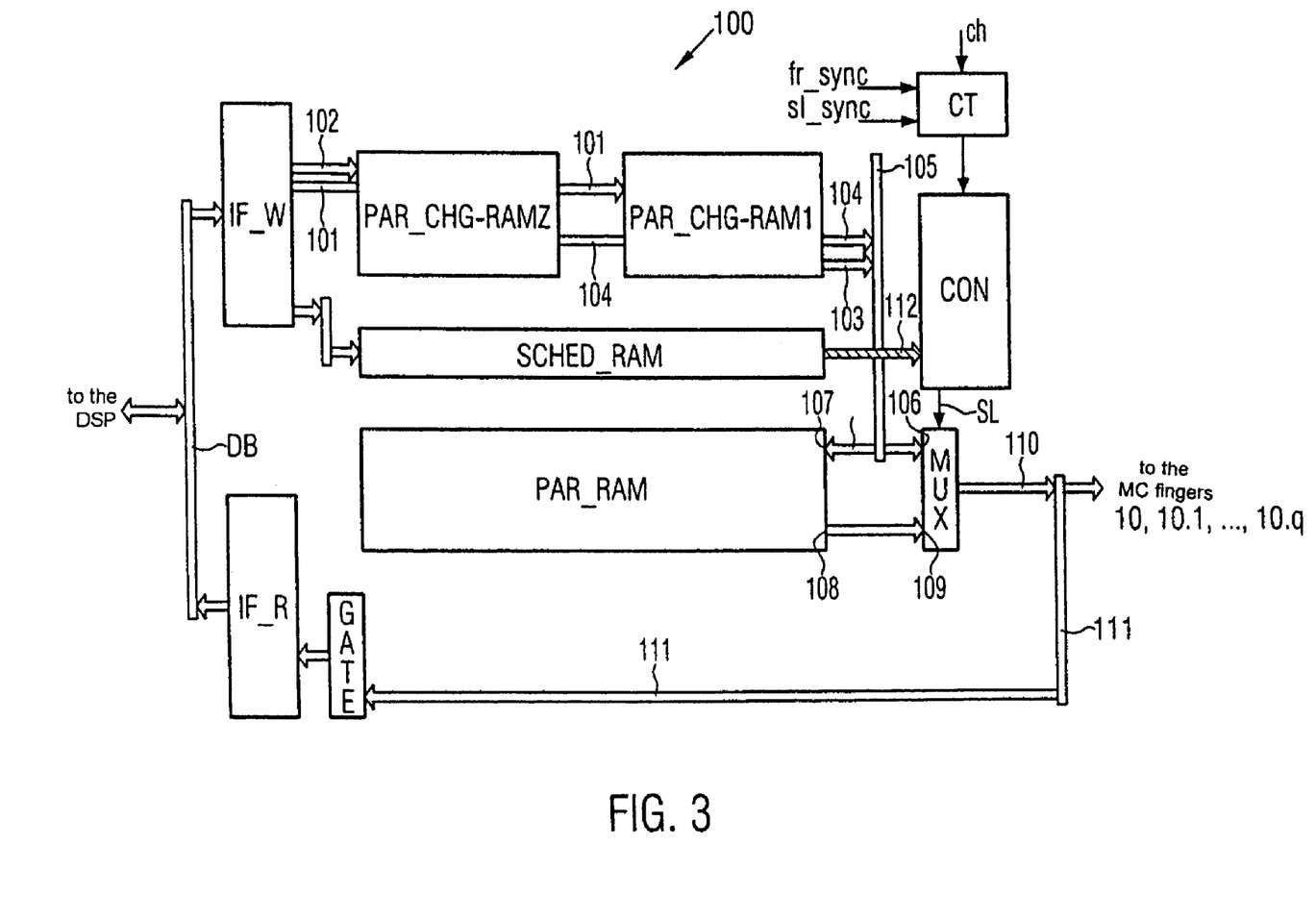
FIG. 3 is a block diagram illustrating the architecture of an exemplary device according to one or more aspects of the present invention for passing parameters to a multicode rake finger, such as that illustrated in FIG. 2.

FIG. 3 shows a device 100 according to one or more aspects of the present invention for passing parameters to the MC rake fingers 10, 10.1, ..., 10.q illustrated in FIG. 2. The device 100 has a parameter memory PAR_RAM, a first parameter change memory PAR_CHG_RAM1, a second parameter change memory PAR_CHG_RAM2 and an administration memory SCHED_RAM. The two first and second parameter change memories PAR_CHG_RAM1 and PAR_CHG_RAM2 are connected via a data bus DB, a write interface IF_W and first and second data links 101 and 102, respectively to the DSP. On the output side, that is to say for a read access, the two first and second parameter change memories PAR_CHG_RAM1/2 are connected via data links 103 and 104, respectively, to a data link 105, which leads to a first input 106 of a multiplexer MUX. At the same time, the data link 105 is connected to a write input 107 for the parameter memory PAR_RAM. A read output 108 from the parameter memory PAR_RAM is supplied to the second input 109 of the multiplexer MUX. The output of the multiplexer MUX is connected via the data link 110 to the MC rake fingers 10, 10.1, ..., 10.q, in order to provide them with the capability to access the current parameters at any given time. Furthermore, a data link 111 is provided, via which the DSP can access the current parameters, for monitoring purposes. The DSP access is made via the data bus DB, a read interface IF_R and the port GATE.

The device 100 also has a controller CON, which controls the read and write processes in the device 100 in a manner which will be described in more detail later. The input side of the controller CON is connected to a chip counter CT, and accesses the administration memory SCHED_RAM for reading purposes via a data link 112. The controller CON is connected to the switching input of the multiplexer MUX via a control line SL. Further control lines for write/read switching for the individual data memories PAR_RAM, PAR_CHG_RAM1/2, SCHED_RAM etc. have been omitted from FIG. 3, for purposes of simplicity.

By way of example, the following text is based on the assumption that q=31, that is to say that the rake receiver has 32 MC rake fingers 10, 10.1, ..., 10.q.

The contents of the parameter memory PAR_RAM are explained by Table 1.

TABLE 1

| | |
|---|---|
| MC_1_1 | ena_1_1, deloff_1; |
| | scr_gen_id_1_1, scr_gen_offset_1_1, spr_gen_id_1_1, spr_gen_offset_1_1; |
| | sf_1_1; |
| | slot_format_1_1; |
| | sttd_1; |
| | mrc_id_1_1; |
| MC_1_2 | |
| MC_1_3 | |
| MC_1_4 | |
| ... | |
| MC_16_1 | |
| MC_16_2 | |
| MC_16_3 | |
| MC_16_4 | |
| ... | |
| MC_32_1 | |
| MC_32_2 | |
| MC_32_3 | |
| MC_32_4 | |

The notation used is as follows: r denotes the number of the MC rake finger, r=1, ..., 32, and y denotes the demodulating unit for the MC rake finger, y=1 ..., 4. The units 12, 13, 20, 21, 17 (which depend only on r) and 14.1, 15.1, 16.1 (which depend on r and y) for the MC rake finger 10 illustrated in FIG. 2 are thus denoted by, for example, r=1 and y=1.

The demodulator units for all of the MC rake fingers are quoted using the notation MC_r_y in the first column of Table 1.

The second column in Table 1 shows the parameters relating to the demodulator units for the MC rake fingers MC_r_y. The relationships between the parameters r and y are evident from the notation. In this case:

| | |
|---|---|
| ena_r_y: | activation bit (ON/OFF) |
| deloff_r: | delay τ |
| scr_gen_id_r_y: | generator identification number for the scrambling sequence |
| scr_gen_offset_r_y: | offset sequence for the scrambling sequence |
| spr_gen_id_r_y: | generator identification number for the spreading code |
| spr_gen_offset_r_y: | offset sequence for the spreading code |
| sf_r_y: | spreading factor sf |
| slot_format_r_y: | identification information for the time slot format |
| sttd_r: | indication bit for the multiple antenna mode |
| mrc_id_r_y: | identification number of the signal (physical channel) |

The parameter generator identification number (scr_gen_id_r_y or spr_gen_id_r_y) and offset sequence (scr_gen_offset_r_y or spr_gen_offset_r_y) define the scrambling sequence that is used and the spreading code that is used. Those skilled in the art are aware that the scrambling sequence and the spreading code are produced by code generators, with the initial connection of the code generators being defined by an offset sequence which is specified in the Standard. The code sequences can now be produced by a number of code generators, which are in the form of hardware or software. The indication of the offset sequence for the scrambling code or for the spreading code as well as the indication of the generator identification number uniquely defines the generation of the code. Details can be found in the 3 GPP UMTS specification: Spreading and Modulation (FDD), 3rd Generation Partnership Project TS 25.213 V4.2.0 (2001-12), in Section 5.2.2., which is hereby incorporated by reference to the content of the present document. For understanding of the present invention, it is sufficient to state that the scrambling sequence to be used is uniquely defined by the parameters scr_gen_id_r_y, scr_gen_offset_r_y and the spreading code to be used for despreading for the demodulator unit y for the rake finger r is uniquely defined by the parameters spr_gen_id_r_y and spr_gen_offset_r_y.

The other entries in Table 1 will likewise be understood by those skilled in the art. The multiple antenna mode STTD is defined in the UMTS Standard and relates to the connection of a second transmission antenna (so-called transmitter-end antenna diversity).

Table 1 thus has 32 (the number of MC rake fingers)×4 (the number of demodulator units for each MC rake finger)=128 line entries. Each line entry represents one parameter set. Each parameter set can be coded by a maximum of 64 bits.

During operation, the MC rake fingers (10, 10.1, ..., 10.q) (with the annotation MC_1_1, ..., MC_32_4 in Table 1) can permanently access the parameter memory PAR_RAM via the data link 110 and the second input 109 of the multiplexer MUX. The 32 MC rake fingers 10, 10.1, ..., 10.q can be set up in a total of 128 system clock cycles of a radio-frequency clock cycle that is used to supply the hardware, that is to say the parameters for a demodulator unit for an MC rake finger 10, 10.1, ..., 10.$q$ can be read in one system clock cycle. A total of 32 (the number of rake fingers)×4 system clock cycles=128 system clock cycles required for the maximum required access to the parameter memory PAR_RAM are obtained for the four demodulator units for one MC rake finger 10, 10.1, ..., 10.$q$ in 4 system clock cycles. If the system clock rate is chosen to be 124.8 MHz, the parameters of all 32 MC rake fingers 10, 10.1, ..., 10.$q$, each having four demodulator units, can be changed within four chip clock cycles (4 chips=130 system clock cycles at 124.8 MHz). This means that the parameter sets for the MC rake fingers 10, 10.1, ..., 10.$q$ are read in advance before the MC rake fingers 10, 10.1, ..., 10.$q$ are activated. Once the MC rake fingers 10, 10.1, ..., 10.$q$ to be allocated have been set up, the reading of the parameter memory PAR_RAM can be suppressed. Entries, which have already been read are simply jumped over.

The following text describes the process by means of which the parameters for a specific MC rake finger r (or else for only one demodulator unit y for it) are changed. The change request is produced by the DSP because, for example, a new data channel is intended to be detected or specific measurement tasks have to be carried out in the meantime by the MC rake finger r on the basis of monitoring channels.

The new parameter set for the demodulation unit y for the MC rake finger r is written via the write interface IF_W and the data links 101 and 102 to the parameter change memories PAR_CHG_RAM1 and PAR_CHG_RAM2. Furthermore, the entries shown in Table 2 are updated in the administration memory SCHED_RAM. The entries in Table 2 are based on the assumption that all the demodulator units for an MC rake finger 10, 10.1, ..., 10.$q$ are changed simultaneously. The situation in which only one of the demodulator units, or less than all of the demodulator units, for an MC rake finger 10, 10.1, ..., 10.$q$ are changed is likewise possible and may be regarded as a extension of the example under consideration. Like Table 1, Table 2 would than have a total of 128 line entries.

TABLE 2

| | |
|---|---|
| MC_1 | MC_1_tact, MC_1_change |
| ... | |
| MC_16 | MC_16_tact, MC_16_change |
| ... | |
| MC_32 | MC_32_tact, MC_32_change |

In this case:

| | |
|---|---|
| MC_r: | is the MC rake finger with the number r |
| MC_r_tact: | is an indication tact, of the time at which the new parameter set is intended to be activated for the MC rake finger with the number r |
| MC_r_change: | is a change flag which indicates by the value 1 that a change should be made to the parameters for the MC rake finger r. |

The loading of the two parameter change memories PAR_CHG_RAM1 and PAR_CHG_RAM2 as well as the writing to the administration memory SCHED_RAM is carried out before the activation time tact. In practice, the DSP normally has a time of two to three time slots in order to load the memories PAR_CHG_RAM1, PAR_CHG_RAM2 and SCHED_RAM.

After this, the new parameter set or sets is or are available for access in the parameter change memories PAR_CHG_RAM1 and PAR_CHG_RAM2. At the same time, a time indication tact exists for the respective MC rake fingers r to be changed (whose change flag has the value 1) regarding when these parameters should actually be updated or activated in the rake receiver.

Figure 4:
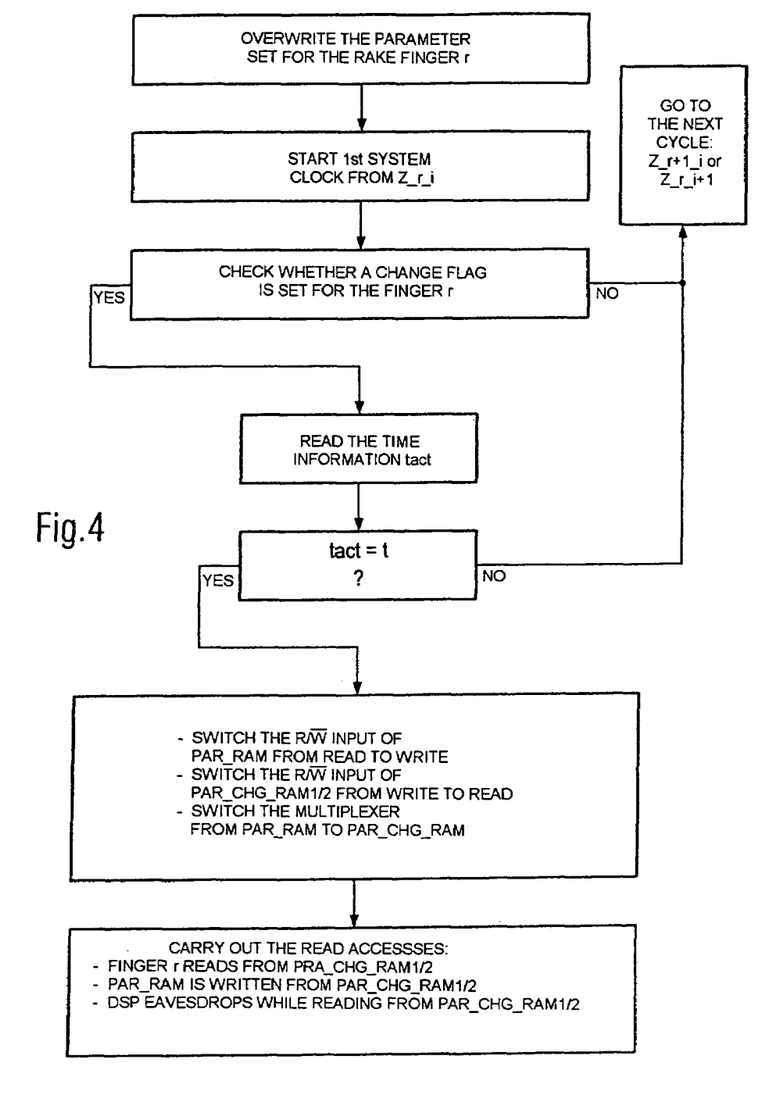
FIG. 4 is a flow diagram illustrating an exemplary method for passing parameters to a rake finger in a rake receiver according one or more aspects of the present invention.

A check is carried out on a cycle Z_r_i, which is repeated every 4 chip clock cycles, to determine whether the change flag MC_r_change has been set for the MC rake finger r, see FIG. 4. If the system frequency is 124.8 MHz, 4 system clock cycles can be reserved for one cycle for each MC rake finger r (a total of 32 rake fingers), in order to change the rake parameters for all 4 demodulator units within 4 chips. The check as to whether the change flag MC_r_change for the MC rake finger r has been set is in the respective cases carried out in the first of the 4 system clock cycles Z_r_i which are associated with the MC rake finger r. This is done by the controller CON sampling the entries contained in the Table 2 in the respective first system clock cycles of 4 system clock cycles which are associated with respective MC rake fingers r. Provided that the change flag MC_r_change for the MC rake finger r has the value 0, the memory entry for this MC rake finger r can be jumped over. Otherwise, the activation time MC_r_tact is read and a check is carried out to determine whether this matches the current time t. If this is not the case, nothing need be done in the cycle under consideration, and the check is repeated in the same way in the next cycle. If the controller CON finds that the activation time tact for a specific MC rake finger r has been reached (that is to say MC_r_tact=t), the following steps are carried out:

the current parameter set is no longer taken from the parameter memory PAR_RAM but from the parameter change memories PAR_CHG_RAM1 and PAR_CHG_RAM2. This is done by switching the write/read input of the parameter change memories PAR_CHG_RAM1 and PAR_CHG_RAM2 from write to read.

the multiplexer MUX is concurrently switched from the second input 109 to the first input 106.

the parameter memory PAR_RAM should concurrently be updated with the new parameter set. This is done by switching the write/read input of the parameter memory PAR_RAM from read to write.

The memory accesses are then made in order to pass the new parameters to the MC rake finger r and to the parameter memory PAR_RAM. Furthermore, as already mentioned, the parameters which have been transferred can be passed via the data link 111, the port GATE and the read interface IF_R to the DSP for monitoring purposes. It should be mentioned that, in this embodiment, the DSP has no direct read access to the parameter memory PAR_RAM. The circuit illustrated in FIG. 3 allows only an "eavesdropping function", that is to say the DSP can listen to the parameters being transmitted from the device to the MC rake fingers 10, 10.1, ..., 10.$q$.

The timings for the writing and reading processes in the device according to the invention will be explained in the following text with reference to FIG. 5.

The device illustrated in FIG. 3 operates in the area to the right of the interfaces IF_W and IF_R using a system clock cycle of, for example, 124.8 MHz. The duration of one chip is thus 32.5 system clock cycles, the duration of 4 chips is 130 system clock cycles. The chip counter CT counts the chips on the basis of a chip signal ch, starting at the beginning of the frame. The beginning of the frame is signaled to the chip counter CT via the synchronization signal fr_sync. The chip counter CT also receives a synchronization signal sl_sync for the start of the time slot.

Figure 5:
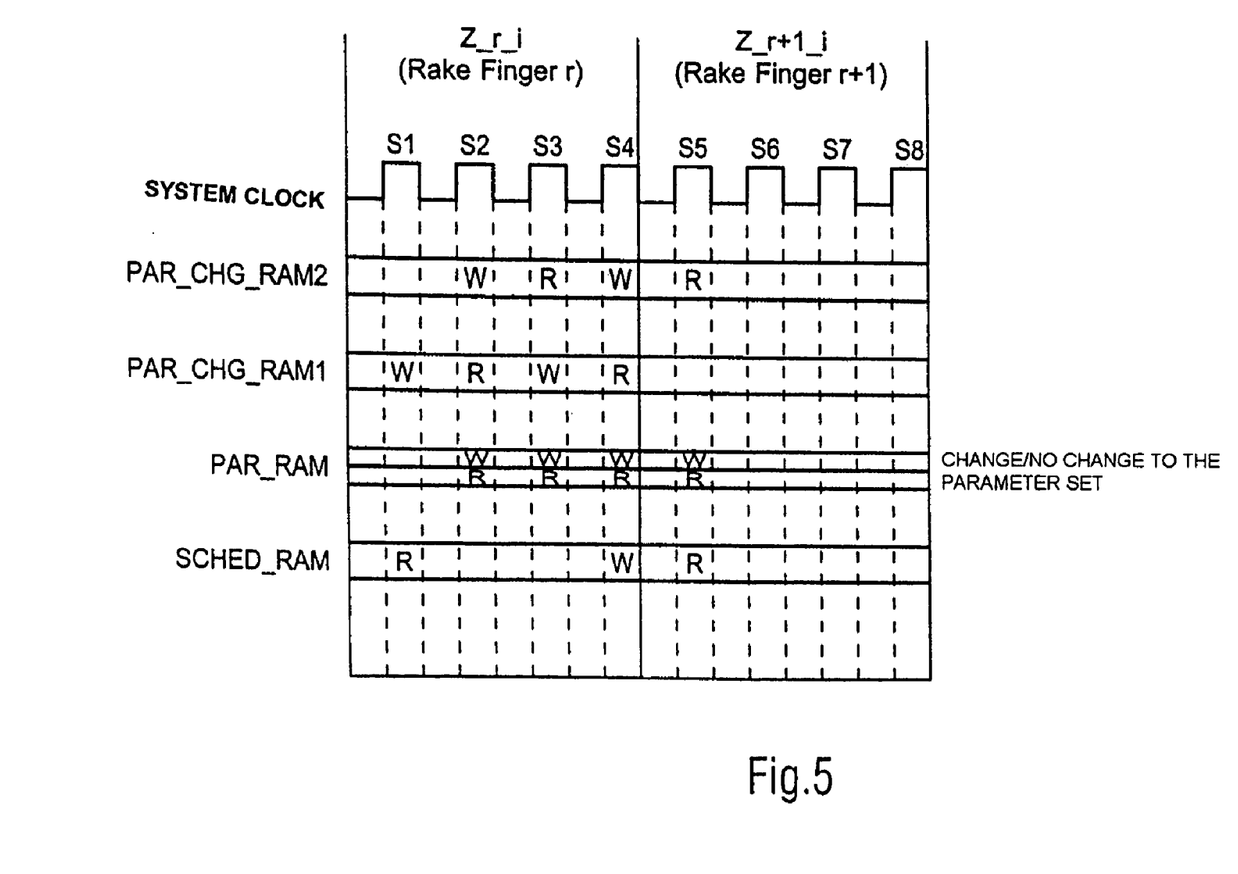
FIG. 5 is a chart illustrating timing of write and read accesses for a device, such as that illustrated in FIG. 3.

FIG. 5 shows eight successive system clock cycles S1, S2, ..., S8 (corresponding to two cycles). The overall sequencing of the device 100 is carried out on the basis of a fixed time frame, whose time intervals are in each case four chip clock cycles. As already mentioned, four system clock cycles are associated with each of the 32 MC rake fingers r within the 4 chip clock cycles. FIG. 5 shows a cycle Z_r_i comprising 4 system clock cycles for the MC rake finger r, and a cycle Z_r+1_i comprising 4 system clock cycles for the MC rake finger r+1. The index i denotes a 4 chip interval of the time frame. The system clock cycles S1 to S4 thus define the i-th cycle Z_r_i for the MC rake finger r, and the system clock cycles S5 to S8 define the i-th cycle Z_r+1_i for the MC rake finger r+1. The first parameter change memory PAR_CHG_RAM1 can be written to in odd-number system clock cycles S1, S3, S5, S7 and can be read from in even-numbered system clock cycles S2, S4, S6, S8. The write accesses to the second parameter change memory PAR_CHG_RAM2 take place in the system clock cycles S2, S4, S6, S8, and the read accesses are in the odd-numbered system clock cycles S2, S3, S5, S7.

Since the data links 101, 102, 103, 104, 105, 110 and 111 have respective widths of 64 bits, one parameter set can be transmitted via these data links in one system clock cycle. This means that the four parameter sets for the four demodulator units y=1, ..., 4 for the one MC rake finger r can be written to the two parameter change memories PAR_CHG_RAM1/2 in four system clock cycles, and that four parameter sets can be read (alternately) from the two parameter change memories PAR_CHG_RAM1/2 likewise in four system clock cycles. In the example described here, the first parameter change memory PAR_CHG_RAM1 is written to (W) in the system clock cycles S1 and S3, and is read from (R) in the system clock cycles S2 and S4. The second parameter change memory is written to (W) in the system clock cycles S2 and S4, and is read from (R) in the system clock cycles S3 and S5. This clearly illustrates that the two parameter change memories are written to and read from alternately and at offset times with respect to one another.

The parameter memory PAR_RAM can either be written to (W) or read from (R) in respective system clock cycles. Provided that no change is made to the parameter set, the read mode is set. A change is made to the write mode if there is any change to the parameter set. In the present example, the parameter sets which have been read from the parameter change memories PAR_CHG_RAM1/2 in the system clock cycles S2, S3, S4 and S5 are written to the parameter memory PAR_RAM in these system clock cycles. The administration memory SCHED_RAM is written to in the fourth system clock cycle S4 in a cycle, and is read from in the first system clock cycle in a cycle. This means that a check is carried out in every first clock cycle of a cycle Z_r_i, Z_r+1_i ... to determine whether it is necessary to activate a new parameter set. If this is the case, the parameters are transmitted in the following four system clock cycles S2, S3, S4 and S5.

One advantage of the time frame Z_r_i, Z_r+1_i ... used here, which comprises four system clock cycles, is that this time frame is also used for the demodulation of the data in the MC rake fingers 10, 10.1, ..., 10.q. The device for transferring data and the MC rake fingers 10, 10.1, ..., 10.q thus operate on the basis of one time frame. This is the reason why two parameter change memories PAR_CHG_RAM1 and PAR_CHG_RAM2 are used. Otherwise, it would not be possible to transmit the parameters for one MC rake finger 10; 10.1; ...; 10.q from the device 100 to the MC rake finger 10, 10.1, ..., 10.q within four chip clock cycles and to additionally allow the DSP to write to the parameter change memories PAR_CHG_RAM1, PAR_CHG_RAM2. It should be noted that single-port RAMs are used in this embodiment. Dual-port RAMs can overcome the restriction relating to two or more parameter change memories PAR_CHG_RAM1/2, although this is associated with the disadvantage that a greater surface area would be required.

Finally, it should be mentioned that that the data bus DB and the data link to the DSP have a reduced bit width of, for example, 16 bits. Furthermore, the DSP operates at a different operating clock rate, for example 26, 52 or 78 MHz. For these reasons, the interfaces IF_W and IF_R have internal intermediate buffers in which it is possible to temporarily store approximately the number of parameters for three MC rake fingers, that is to say 12 parameter sets.

Although the invention has been shown and described with respect to a certain aspect or various aspects, it is obvious that equivalent alterations and modifications will occur to others skilled in the art upon the reading and understanding of this specification and the annexed drawings. In particular regard to the various functions performed by the above described components (e.g., assemblies, devices, circuits, etc.), the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several aspects of the invention, such feature may be combined with one or more other features of the other aspects as may be desired and advantageous for any given or particular application. Furthermore, to the extent that the term "includes" is used in either the detailed description or the claims, such term is intended to be inclusive in a manner similar to the term "comprising." Also, exemplary is merely intended to mean an example, rather than the best.

The invention claimed is:

1. A method for passing parameters to a time-multiplexed rake finger in a rake receiver, comprising:
   operating the time-multiplexed rake finger with a first parameter set by accessing the first parameter set, which is kept available in a first memory area, wherein the first parameter set comprises setting information for allocating the time-multiplexed rake finger to a plurality of physical channels;
   loading a second parameter set, different from the first parameter set, into a second memory area, wherein the second parameter set comprises setting information for re-allocating the time-multiplexed rake finger to another plurality of physical channels;
   checking whether a switching condition is satisfied; and
   switching the access for the time-multiplexed rake finger from the first memory area to the second memory area when the switching condition is satisfied.

2. The method of claim 1, wherein checking for the switching condition is carried out at time intervals in a fixed time frame.

3. The method of claim 2, wherein the time intervals are shorter than one time slot period.

4. The method of claim 2, wherein the time intervals are respective 4 chip time periods ($T_c$).

5. The method of claim 2, wherein the switching condition for the implemented time-multiplexed rake fingers is checked within a time interval of 4 chip time periods ($T_c$).

6. The method of claim 1, further comprising:
loading the second parameter set into the first memory area.

7. The method of claim 6, wherein the second parameter set is accessed by the time-multiplexed rake finger and loaded into the first memory area by means of a read operation, which is carried out on the second memory area.

8. The method of claim 1, wherein, while loading the second parameter set into the second memory area, a change flag is set in an administration memory and time information is entered in the administration memory which indicates the time at which the switching of the time-multiplexed rake finger should take place.

9. The method of claim 8, wherein the switching condition is satisfied when the change flag is set, and the switching time has been reached.

10. The method of claim 1, wherein the parameter sets contain at least one of a delay offset for the time-multiplexed rake finger, information relating to a scrambling sequence to be used, information relating to a spreading code to be used, and a spreading factor.

11. The method of claim 1, wherein there are 32 fingers.

12. A device for passing parameters to a time-multiplexed rake finger in a rake receiver, comprising:
a first memory area for a first parameter set of operating parameters for the time-multiplexed rake finger, the first parameter set comprising setting information for allocating the time-multiplexed rake finger to a plurality of physical channels;
a second memory area for a second parameter set of operating parameters for the time-multiplexed rake finger, different from the first parameter set, the second parameter set comprising setting information for allocating the time-multiplexed rake finger to another plurality of physical channels;
a control means which checks whether a switching condition is satisfied, and
a switching means which switches access for the time-multiplexed rake finger from the first memory area to the second memory area when the control means finds that the switching condition has been satisfied.

13. The device of claim 12, wherein the control means checks for the satisfaction of the switching condition at time intervals in a fixed time frame.

14. The device of claim 13, wherein the time intervals are respective 4 chip time periods ($T_c$).

15. The device of claim 13, wherein the control means checks for the satisfaction of the switching condition for the implemented time-multiplexed rake fingers within a time interval of 4 chip time periods ($T_c$).

16. The device of claim 12, further comprising:
a data link via which the time-multiplexed rake fingers and the first memory area can access data in the second memory area.

17. The device of claim 12, further comprising:
an administration memory in which a change flag indicates whether the second parameter set has been loaded in the second memory area, and in which time information indicates the time at which the switching of the time-multiplexed rake finger should take place.

18. The device of claim 12, wherein the second memory area is formed by a number of individual RAMs.

19. The device of claim 12, wherein a processor is connected for access purposes via a data link to the output of the switching means.

20. The device of claim 12, wherein there are 32 fingers.

21. The method of claim 1, wherein the first parameter set is held only within the first memory area, and wherein the second parameter set is held only within the second memory area, different from the first memory area.

22. A method for passing parameters to a time-multiplexed rake finger in a rake receiver, comprising:
operating the time-multiplexed rake finger with a first parameter set by accessing the first parameter set, which is kept available in a first memory area, wherein the first parameter set comprises setting information for allocating the time-multiplexed rake finger to a plurality of physical channels;
loading a second parameter set, different from the first parameter set, into a second memory area, wherein the second parameter set comprises setting information for re-allocating the time-multiplexed rake finger to another plurality of physical channels;
checking whether a switching condition is satisfied;
switching the access for the time-multiplexed rake finger from the first memory area to the second memory area when the switching condition is satisfied; and
loading the second parameter set into the first memory area, wherein loading the second parameter set into the first memory area is performed while the time-multiplexed rake finger accesses the second memory area.

23. A device for passing parameters to a time-multiplexed rake finger in a rake receiver, comprising:
a first memory area for a first parameter set of operating parameters for the time-multiplexed rake finger, the first parameter set comprising setting information for allocating the time-multiplexed rake finger to a plurality of physical channels;
a second memory area for a second parameter set of operating parameters for the time-multiplexed rake finger, different from the first parameter set, the second parameter set comprising setting information for allocating the time-multiplexed rake finger to another plurality of physical channels;
a control means which checks whether a switching condition is satisfied, and
a switching means which switches access for the time-multiplexed rake finger from the first memory area to the second memory area when the control means finds that the switching condition has been satisfied; and
a loading means which loads the second parameter set into the first memory area, wherein loading the second parameter set into the first memory area is performed while the time-multiplexed rake finger accesses the second memory area.

24. A method for passing parameters to a time-multiplexed rake finger in a rake receiver, comprising:
operating the time-multiplexed rake finger with a first parameter set by accessing the first parameter set, which is kept available in a first memory area, wherein the first parameter set comprises setting information for allocating the time-multiplexed rake finger to a plurality of physical channels;
loading a second parameter set, different from the first parameter set, into a second memory area, wherein the second parameter set comprises setting information for re-allocating the time-multiplexed rake finger to another plurality of physical channels;
checking whether a switching condition is satisfied;
switching the access for the time-multiplexed rake finger from the first memory area to the second memory area when the switching condition is satisfied; and loading the second parameter set into the first memory area, wherein loading the second parameter set into the first memory area is performed while the time-multiplexed rake finger accesses the second memory area;

and wherein, while loading the second parameter set into the second memory area, a change flag is set in an administration memory and time information is entered in the administration memory which indicates the time at which the switching of the time-multiplexed rake finger should take place.

25. A device for passing parameters to a time-multiplexed rake finger in a rake receiver, comprising:

a first memory area for a first parameter set of operating parameters for the time-multiplexed rake finger, the first parameter set comprising setting information for allocating the time-multiplexed rake finger to a plurality of physical channels;

a second memory area for a second parameter set of operating parameters for the time-multiplexed rake finger, different from the first parameter set, the second parameter set comprising setting information for allocating the time-multiplexed rake finger to another plurality of physical channels;

a control means which checks whether a switching condition is satisfied;

a switching means which switches access for the time-multiplexed rake finger from the first memory area to the second memory area when the control means finds that the switching condition has been satisfied; and a loading means which loads the second parameter set into the first memory area, wherein loading the second parameter set into the first memory area is performed while the time-multiplexed rake finger accesses the second memory area, and wherein, while loading the second parameter set into the second memory area, a change flag is set in an administration memory and time information is entered in the administration memory which indicates the time at which the switching of the time-multiplexed rake finger should take place.

* * * * *